United States Patent [19]
Vig

[11] Patent Number: 5,971,682
[45] Date of Patent: Oct. 26, 1999

[54] TOOLHOLDER

[75] Inventor: Istvan Vig, Bettlach, Switzerland

[73] Assignee: Polytool AG, Bettlach, Switzerland

[21] Appl. No.: 09/088,635

[22] Filed: Jun. 2, 1998

[30] Foreign Application Priority Data

Jun. 5, 1997 [CH] Switzerland ............................. 1353/97

[51] Int. Cl.⁶ .................................................. B23B 31/36
[52] U.S. Cl. .............................. 409/234; 279/6; 408/146; 408/147
[58] Field of Search ......................... 279/6, 133; 409/234; 408/146, 147, 180, 187

[56] References Cited

U.S. PATENT DOCUMENTS

| | | | |
|---|---|---|---|
| 2,833,544 | 5/1958 | Blades | 279/6 |
| 5,533,847 | 7/1996 | Basteck | 409/234 |
| 5,752,706 | 5/1998 | Hodges | 279/6 |

*Primary Examiner*—Steven C. Bishop
*Attorney, Agent, or Firm*—Goodman & Teitelbaum, Esqs.

[57] ABSTRACT

For correcting eccentricity of a tool chucked in a first part of an at least two-part toolholder, which first part is detachably connected via clamping means to a second part of the toolholder, which is clamped in a machine tool and rotates about an axis of rotation, setting means are provided by means of which the first part of the toolholder is displaceable relative to the second part. Radial eccentricity of the tool can thereby be corrected. Furthermore, between the first and second parts of the toolholder, two rings are disposed coaxially with, and rotatingly about, the axis of rotation. These rings have annular surfaces, one of which is inclined relative to the other at a certain angle. By mutual rotation of the two rings, the first part of the toolholder can be inclined relative to the second part, whereby an angular error of the tool can also be corrected.

12 Claims, 3 Drawing Sheets

TOOLHOLDER

This invention relates to machine tools, and more particularly to a toolholder of a machine tool, which toolholder comprises a first part with a tool-holding fixture, in which the tool can be chucked, and a second part which can be fixed in the machine tool and which rotates about an axis of rotation, which first part is detachably connected to the second part by clamping means, and the first part of the toolholder, on the side thereof facing the second part, having a flange with a surface aligned perpendicular to the axis of rotation and supported on supporting means of the second part, and the first part of the toolholder being displaceable relative to the second part via setting means, and the eccentricity of the tool being thereby correctable.

Eccentricity of a tool chucked in a tool carrier of a two-part toolholder, which is in turn chucked in a machine tool and rotates about an axis of rotation, may come about, on the one hand, in that the axis of the tool is shifted relative to the axis of rotation of the toolholder. On the other hand, eccentricity of such a tool may come about either in addition thereto or by itself because the axis of the tool is tilted relative to the axis of rotation, meaning that there is an angular error.

U.S. Pat. No. 4,776,734, for example, shows apparatus for displacing the axis of a tool held by a two-part toolholder. The two holder parts are connected to one another by clamping screws of a flange connection. Thus, one of the holder parts can be displaced relative to the other by adjusting means consisting of a setscrew threaded into a setting ring guided rotatingly on the cylindrical peripheral surface of the other holder part. For this purpose, the setscrew can be rotated after loosening of the clamping means, whereby the desired displacement of the one holder part relative to the other takes place.

One drawback of that apparatus is that whereas parallel displacement of the tool can be undertaken, angular errors of the tool cannot be rectified.

Another drawback of that apparatus is that through the setting ring slipped over the cylindrical peripheral surfaces of the two holder parts of the toolholder, the diameter of the toolholder is increased.

For rectifying an angular error, two-part toolholders have also been constructed in which setscrews are affixed in addition to the clamping screws. One of the holder parts of the toolholder is thus supported via the setscrews on the other holder part. Hence, by adjusting the setscrews, an angular position of the one holder part relative to the other can be achieved. It has turned out, however, that with such apparatus, it is not possible to correct in a reproducible manner an eccentric deviation in the form of an angular error of a tool.

Particularly in the case of guide reamers or multistage reamers, it has been shown that exact truing would be desirable, in which connection both of the above-mentioned possibilities of eccentricity should be correctable.

It is the object of this invention to provide improved apparatus by means of which it is possible in a simple manner to correct eccentricity of a tool which may arise both because of a shift of the axis of the tool relative to the axis of rotation and because of an angular error of the axis of the tool relative to the axis of rotation of the machine tool.

To this end, in the apparatus according to the present invention, the supporting means comprise a first ring and a second ring, each having two flat annular surfaces, the rings are disposed substantially coaxially with, and rotatingly about, the axis of rotation between the first part and the second part of the toolholder, and one of the annular surfaces of each of the rings is inclined at an angle to the other annular surface of the respective ring.

Because the first part of the toolholder has a flange on the side facing the second part, which flange is supported by the supporting means of the second part, the first part can be displaced radially to the axis of rotation relative to the second part, whereby parallel displacement of the axis of the tool is made possible. Moreover, because the supporting means comprise two rings lying one over the other, advantageously having annular surfaces resting against one another, each of which is inclined at an angle $\alpha$, a modification of the angular position of the axis of the tool to the axis of rotation can be achieved by rotating one of the rings relative to the other.

The two rings are preferably disposed in a groove-shaped recess in the second part of the toolholder, one of the two rings being provided with an encircling projecting collar in the region of the inside diameter. The other ring is set on this collar in such a way that its inside surface rests against the outside surface of the collar. Mutual rotation of the two rings or joint rotation of the rings can thereby optimally be obtained.

To avoid tilting of the other ring set upon the collar of the one ring owing to the inclined surfaces upon rotation of the one ring relative to the other ring, which must be guided substantially without play, the outside surface of the collar is convex.

So that mutual rotation of the two rings or joint rotation of the two rings presents no problem, the two rings are provided with releasable stop means.

The rings are preferably provided at their peripheries with a scale so that the respective mutual positions of the two rings, as well as the position relative to the second part of the toolholder, can readily be determined, and the desired position can be set.

Since the screws acting as clamping means must be loosened for correcting eccentricity and unintentional shifting is thereby avoided, spring washers are affixed between the heads of the screws and the first part of the toolholder, whereby a bias is obtained which allows truing.

The setting means for displacing the first part of the toolholder relative to the second part are designed in such a way that they can be placed on the toolholder for correcting the eccentricity and thereafter taken off it again. This presents the advantage that the setting means can be used for toolholders having differing diameters.

A preferred embodiment of the invention will now be described in detail with reference to the accompanying drawings, in which.

Figure 1:
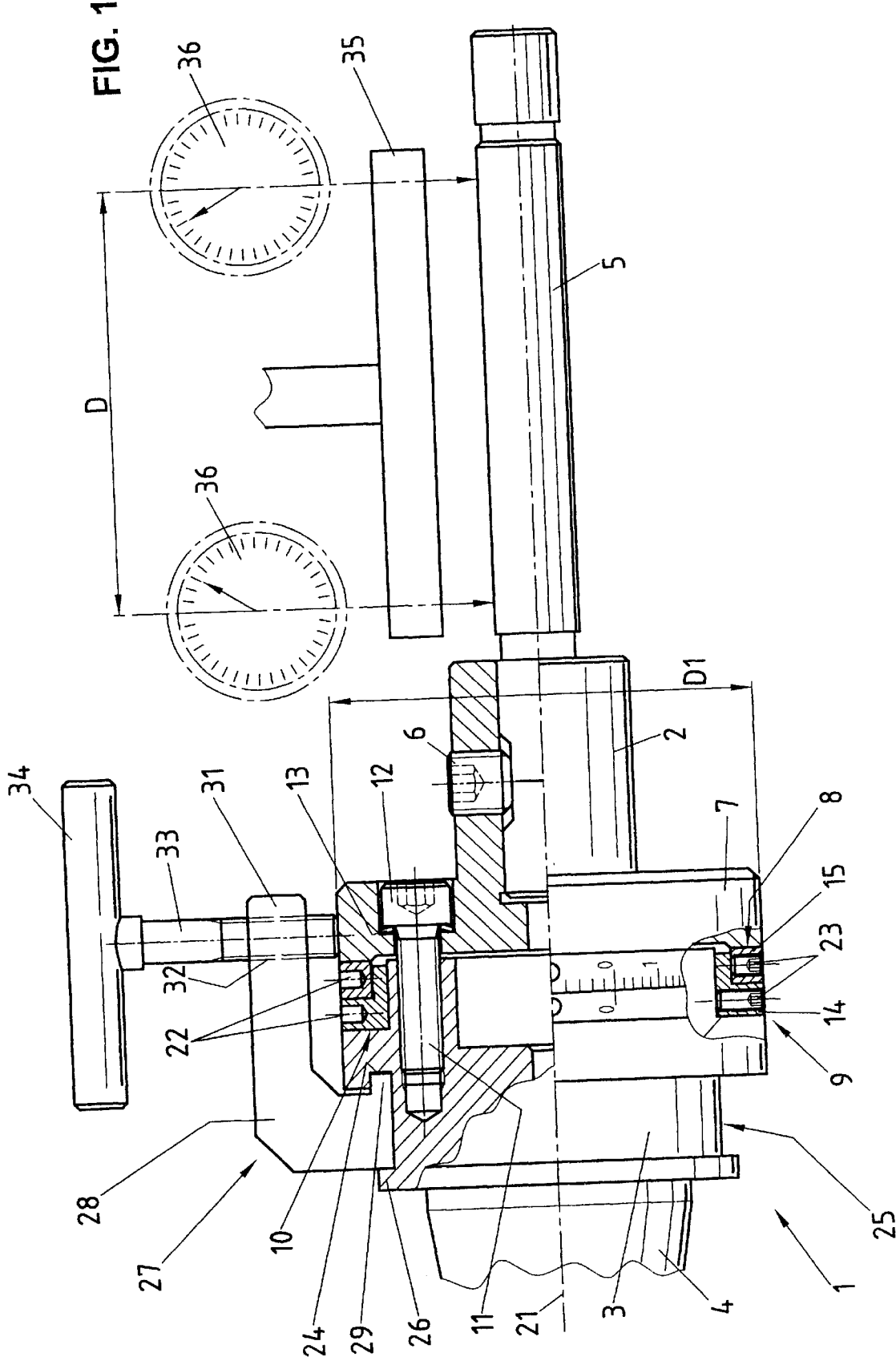
FIG. 1 is an elevation of the inventive apparatus, partly in section.

As may be seen in FIG. 1, a toolholder 1 is composed of a first part 2 and a second part 3. The second part 3 can be chucked in a machine tool (not shown) in a manner known per se, e.g., by means of a taper sleeve 4.

A tool 5, e.g., a reamer, can be inserted in the first part 2 and is held there by means of a clamping bolt 6.

The first part 2 and the second part 3 of the toolholder 1 are flange-shaped on the sides facing each other. The surface 8 formed by the flange 7 of the first part 2 is supported, when the toolholder 1 is assembled, upon supporting means 9 inserted in a groove-shaped recess 10 of the second part 3. The first part 2 and the second part 3 are clamped together by clamping means in the form of screws 11, spring washers 13 being fixed between the heads 12 of the screws 11 and the first part 2. The surface 8 and the supporting means 9 are aligned substantially perpendicular to the axis of rotation 21 about which the toolholder 1 rotates with the tool 5 when chucked in the machine tool.

Figure 2:
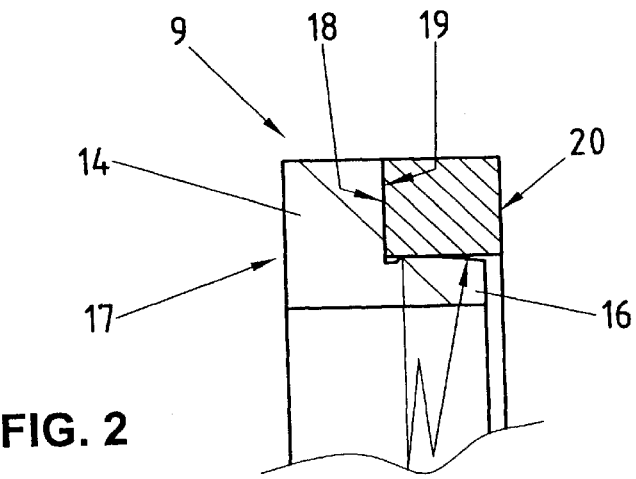
FIG. 2 is a cross-section on a larger scale through the two rings of the apparatus of FIG. 1.

The supporting means 9 are composed of a first ring 14 and a second ring 15, as may be better seen in FIG. 2. The first ring 14 is provided in the region of the inside diameter with an encircling projecting collar 16; the second ring 15 is slipped over the collar 16 in such a way that its inside surface rests against the outside surface of the collar 16. This outside surface of the collar 16 is slightly convex.

The first ring 14 has a first annular surface 17 and a second annular surface 18, while the second ring 15 likewise has a first annular surface 19 and a second annular surface 20. The second annular surface 18 of the first ring 14 and the first annular surface 19 of the second ring 15 rest against one another. The second annular surface 18 is inclined toward the first annular surface 17 of the first ring 14; the first annular surface 19 is likewise inclined by the same amount relative to the second annular surface 20 of the second ring 15. This inclination is very slight, e.g., for an outside diameter of 100 mm of the two rings 14 and 15 it amounts to about 0.1 mm, corresponding to an angle α of about 0.06°.

As may be seen in FIG. 1, the two rings 14 and 15 can rotate about the axis of rotation 21. For this purpose they are each provided with a bore 22 in which an appropriate tool may be inserted. The two rings 14 and 15 can be rotated individually or jointly; they can be locked by means of stop screws 23.

The second part 3 of the toolholder 1 includes an encircling groove 24. Adjacent to the groove 24 is a cylindrical area 25 closed on the side nearest the taper sleeve 4 by an annular rim 26.

The setting means 27 can be inserted in this cylindrical area 25. The setting means 27 comprise a holding portion 28 provided with a cam 29 which, when the setting means 27 are inserted as shown in FIG. 1, comes to lie in the groove 24. The holding portion 28 is thus supported on the cylindrical area 25 of the second part 3 of the toolholder 1.

The holding portion 28 is provided with a projection 31 extending over the first part 2. The projection 31 includes a through bore 32 provided with a thread into which a threaded bolt 33 having a turning handle 34 is screwed. The bore 32 in the projection 31 is so disposed that the threaded bolt 33 acts upon the flange of the first part 2 of the toolholder 1.

Attached in the area of the tool 5 inserted in the toolholder 1 is a supporting frame 35 holding two measuring means 36, e.g., dial gauges, spaced from one another by a distance D and having measuring sensors which come in contact with the tool 5. The supporting frame 35 can be detachably fastened to the machine tool in a manner not shown.

Figure 3:
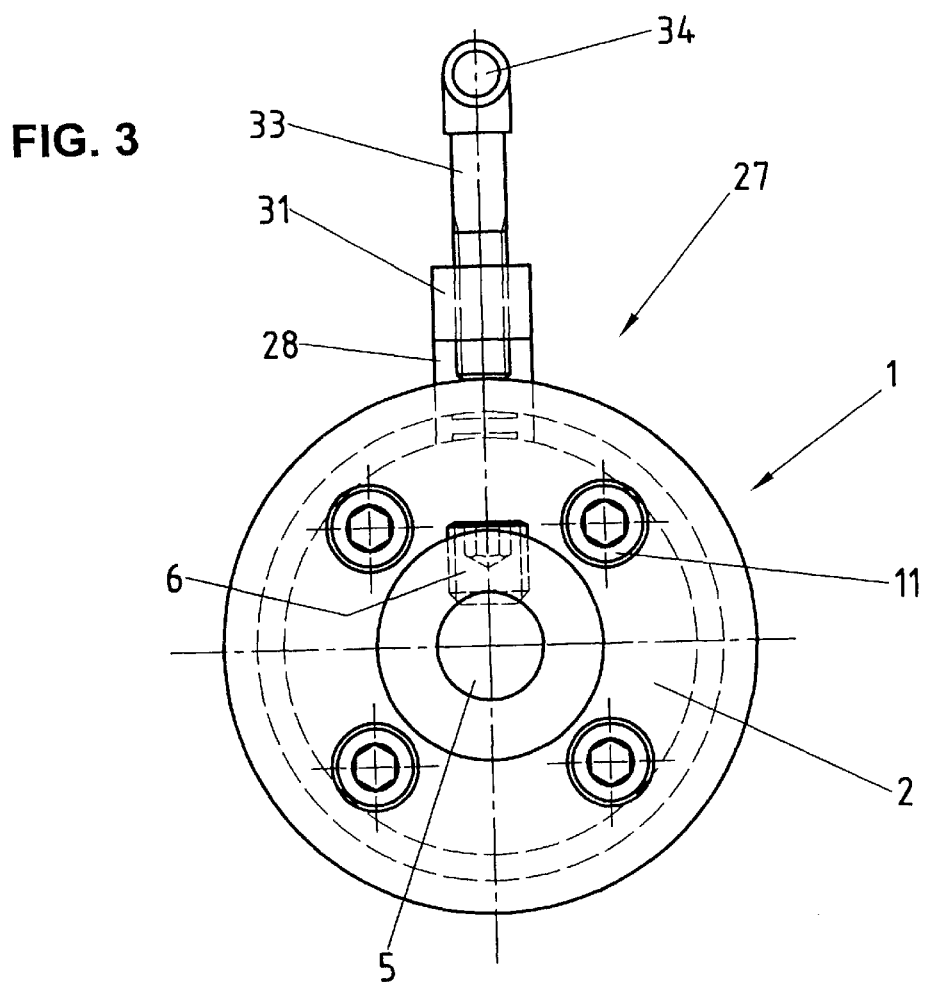
FIG. 3 is a front elevation of the setting element when set on the toolholder.

FIG. 3, a front elevation of the toolholder 1, shows the first part 2 with the tool 5 inserted therein and held by the clamping bolt 6, as well as the screws 11 by means of which the first part 2 can be clamped to the second part (not visible) of the toolholder 1. Likewise in place are the setting means 27, comprising the holding portion 28, the projection 31, and the threaded bolt 33 with its turning handle 34.

When a tool 5 is inserted in the toolholder 1 as shown in FIG. 1, it can now be trued, for which purpose the supporting frame 35 with the two measuring means 36 is placed in the position shown in FIG. 1.

Figure 4:
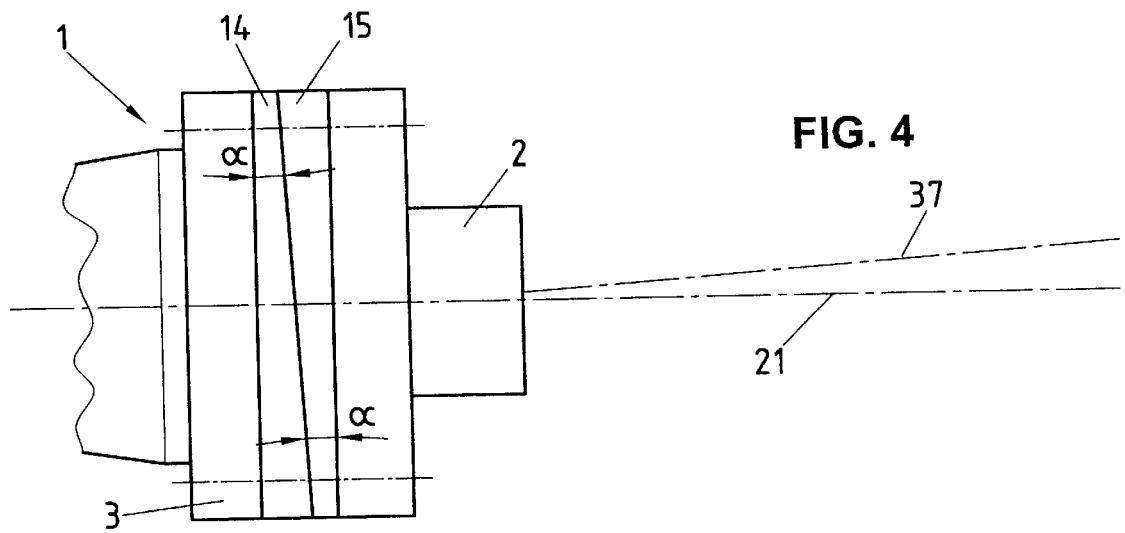
FIG. 4 is a diagram of a tool with eccentricity.

As illustrated diagrammatically in FIG. 4, the axis 37 of the chucked tool may be at an angle to the axis of rotation 21 of the toolholder 1, this being drawn somewhat exaggerated in FIG. 4. The first ring 14 and the second ring 15 are so positioned with respect to one another that the first part 2 is exactly parallel to the second part 3 of the toolholder 1. For better understanding, the inclinations of the respective surfaces of the rings 14 and 15, designated by angle α, are exaggerated in size. The correct position of the rings 14 and 15 relative to one another can be checked by means of scales appearing thereon (see FIG. 1), the first part 2 and the second part 3 being parallel when the zero markings of the two scales coincide. The clamping screws are then screwed in until the spring washers 13 are tight.

With the aid of the measuring means disposed nearest the toolholder 1, the concentricity or true running of the tool at this location is set. For this purpose, the greatest eccentric deflection of the tool indicated on that measuring means is brought into the position facing the measuring means. The setting means 27 is placed on the toolholder 1 as shown in FIG. 1, the threaded bolt 33 is pressed against the first part 2 by means of the turning handle 34, the first part 2 is displaced relative to the second part 3 until the tool runs true in the vicinity of the mentioned measuring means. With respect to FIG. 4, this means that the axis 37 of the tool is shifted toward the axis of rotation 21 until it intersects therewith in the vicinity of the mentioned measuring means.

If there is also an angular error, as is assumed in the illustration of FIG. 4, the measuring means 36 remote from the toolholder 1 (cf. FIG. 1) indicates eccentricity. Once more, this eccentricity is corrected in that the maximum deflection is directed toward the measuring means 36 farther from the toolholder 1. The second ring 15 can then be rotated relative to the first ring 14. The scales on the two rings 14 and 15 may be coordinated so that they match the scale of the measuring means 36 remote from the toolholder 1. Thus, by means of the deflection on the mentioned measuring means, the second ring 15 can be rotated by a corresponding scale division. The second ring 15 is then locked relative to the first ring 14, and the first ring 14 is rotated together with the second ring 15 relative to the second part 3 of the toolholder 1 until the greatest thickness of the two rings 14 and 15 is situated where the mentioned measuring means indicated the greatest eccentricity. The first ring 14 is then locked as well.

Figure 5:
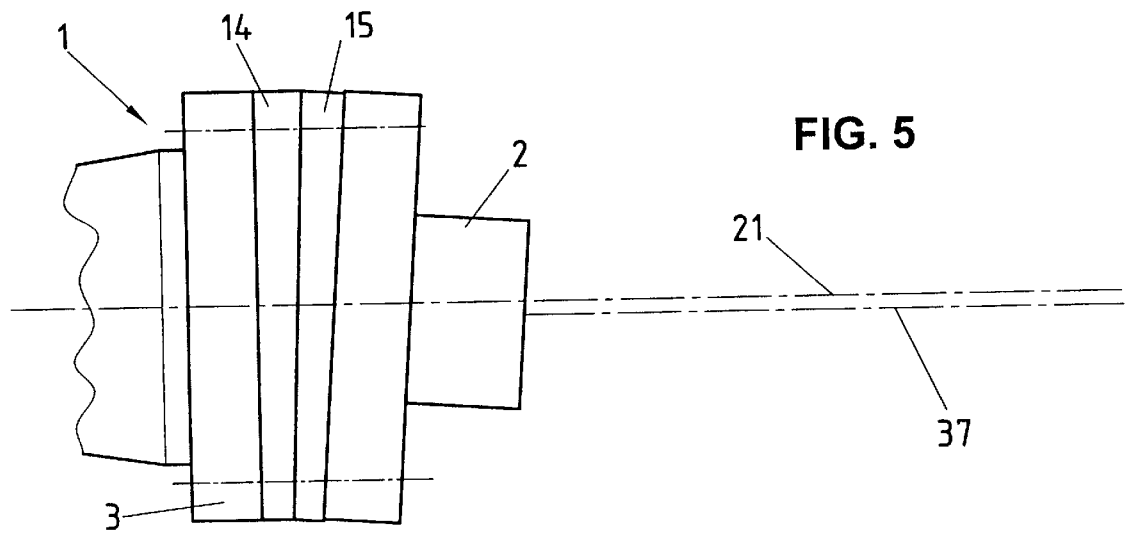
FIG. 5 is a diagram of the same tool with corrected angular error.
Figure 6:
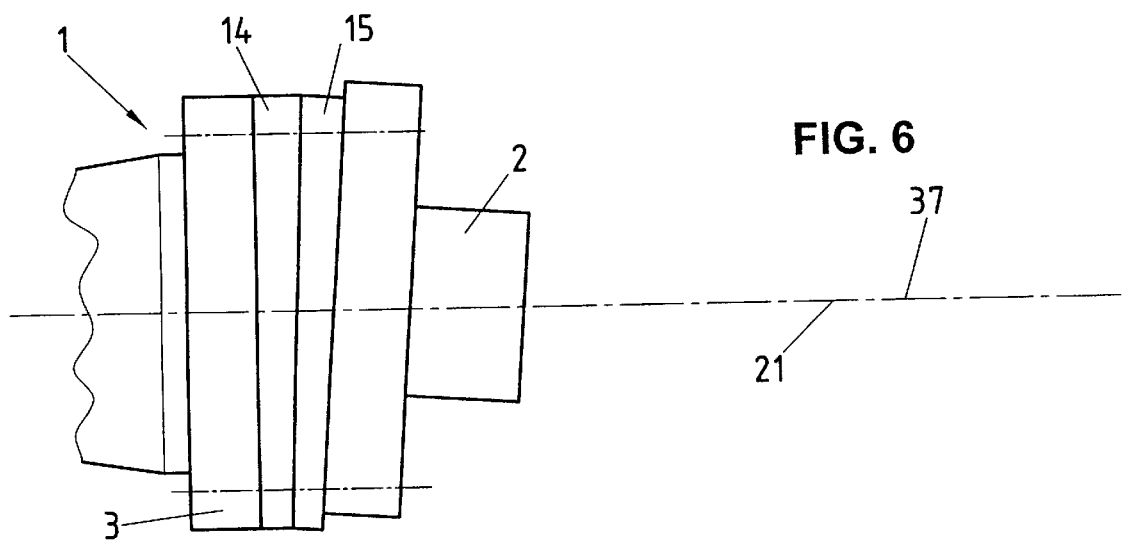
FIG. 6 is a diagram of the apparatus with the tool completely trued.

The setting depicted diagrammatically in FIG. 5 is thereby reached. The axis 37 of the tool is now parallel to the axis of rotation 21. The two measuring means 36 now indicate identical eccentricity of the tool. The setting means 27 may now once more be placed on the toolholder 1 at the location which is in line with the measuring means when the latter indicated the greatest eccentric deflection. As already described previously, the first part 2 of the toolholder can be displaced relative to the second part 3 until the axis 37 of the tool coincides with the axis of rotation 21, as shown in FIG. 6. The screws 11 may then be completely tightened, and the setting means 27 is removed, as is the supporting frame 35 with the measuring means 36 (FIG. 1). The tool is now exactly trued.

As already mentioned, the scale on the second ring 15 preferably corresponds to the scale of the measuring means 36 (FIG. 1). If the distance D between the two measuring means is the same as the diameter D1 of the two rings 14 and 15, this would mean that when the first part 2 of the toolholder is inclined by 0.2 mm, the inclination of the tool 5 between the two measuring means 36 would likewise amount to 0.2 mm. Instead, the distance D may naturally be different, in which case the scale on the second ring 15 would have to be corrected accordingly.

Thus, by means of the inventive apparatus, a tool in a toolholder can be exactly trued, it being possible to correct both radial eccentricity and angular errors.

I claim:

1. Toolholder of a machine tool, which toolholder comprises a first part with a tool-holding fixture, in which the tool can be chucked, and a second part which can be fixed in the machine tool and which rotates about an axis of rotation, which first part is detachably connected to the second part by clamping means, and the first part of the toolholder, on the side thereof facing the second part, having a flange with a surface aligned perpendicular to the axis of rotation and supported on supporting means of the second part, and the first part of the toolholder being displaceable relative to the second part via setting means, and the eccentricity of the tool being thereby correctable, wherein the supporting means comprise a first ring and a second ring, each having two flat annular surfaces, the rings being disposed substantially coaxially with, and rotatingly about, the axis of rotation between the first part and the second part of the toolholder, and one of the annular surfaces of each of the rings being inclined at an angle to the other annular surface of the respective ring.

2. Toolholder according to claim 1, wherein the annular surfaces resting against one another of the two rings are each inclined, and the angle is on the order of magnitude of about 0.1°.

3. Toolholder according to claim 1, wherein the two rings are disposed in a groove-shaped recess of the second part of the toolholder.

4. Toolholder according claim 1, wherein one of the two rings is provided in the region of the inside diameter with an encircling projecting collar, the other ring being slipped over this collar in such a way that its inside surface rests against the outside surface of the collar.

5. Toolholder according to claim 4, wherein the outside surface of the collar has a convex shape.

6. Toolholder according to claim 1, wherein both rings are provided with releasable stop means, both rings being provided with means whereby the rings are rotatable by means of a turning tool.

7. Toolholder according to claim 1, wherein at least one of the two rings is provided at its periphery with a scale.

8. Toolholder according claim 1, wherein the clamping means take the form of screws, spring washers being fixed between the heads of the screws and the first part of the toolholder.

9. Toolholder according to claim 1, wherein the setting means comprise a holding portion which can be placed on the second part of the toolholder, which includes a setting element, and which is removable after displacement of the first part of the toolholder relative to the second part.

10. Apparatus according to claim 9, wherein the holding portion is provided with a cam insertable in an encircling groove made in the second part of the toolholder, the holding portion being provided with a projection which, when placed upon the toolholder, extends over the two parts of the toolholder, the setting element being disposed in this projection and acting upon the first part.

11. Apparatus according to claim 10, wherein the setting element comprises a threaded bolt screwable into a correspondingly threaded bore in the projection of the holding portion, said bore being aligned substantially perpendicular to the axis of rotation, and the threaded bolt being provided with a turning handle.

12. Apparatus according to claim 9, wherein the setting element comprises a threaded bolt screwable into a correspondingly threaded bore in a projecting part of the holding portion, said bore being aligned substantially perpendicular to the axis of rotation, and the threaded bolt being proviced with a turning handle.

* * * * *